United States Patent [19]

Ericksen

[11] Patent Number: 5,059,071
[45] Date of Patent: Oct. 22, 1991

[54] HINGE INSTALLATION TOOL

[76] Inventor: Colin W. Ericksen, 13428 The Square, Poway, Calif. 92064

[21] Appl. No.: 510,864

[22] Filed: Apr. 17, 1990

[51] Int. Cl.⁵ .......................... B23C 1/20; B27F 5/12; B23B 49/04
[52] U.S. Cl. ...................................... 409/182; 144/27; 408/99
[58] Field of Search ............... 409/180, 181, 182, 218, 409/178; 408/91, 72 R, 114, 115 R, 110, 112, 99, 108, 109; 144/27

[56] References Cited

U.S. PATENT DOCUMENTS

| | | | |
|---|---|---|---|
| 2,888,965 | 6/1959 | Phillips | 408/712 |
| 2,987,087 | 6/1961 | Norman et al. | 144/27 |
| 3,053,293 | 9/1962 | Nissen | 409/182 |
| 3,206,861 | 9/1965 | Damijonaitis et al. | 144/27 X |
| 3,211,026 | 10/1965 | Calahan | 144/27 X |
| 3,320,983 | 5/1967 | Adams | 144/27 |
| 3,324,907 | 6/1967 | Stepanek | 144/27 |
| 4,474,514 | 10/1984 | Jensen | 408/115 R |
| 4,501,308 | 2/1985 | Sherman | 409/178 X |

FOREIGN PATENT DOCUMENTS 2110924  9/1972  Fed. Rep. of Germany ...... 408/712

Primary Examiner—William Briggs

[57] ABSTRACT

A hardware installation device for boring or drilling wood, plastic or metal and is more particularly concerned with providing a precise location of pilot holes for attachment screws and material removal by boring or drilling means.

1 Claim, 2 Drawing Sheets

HINGE INSTALLATION TOOL

FIELD OF INVENTION

This invention relates to cabinetry and arose from the need to bore a recessed area to accommodate the cup portion of European concealed hinges and to provide a pilot hole for the hinge attachment screws.

CROSS-REFERENCES TO CORRESPONDING APPLICATIONS

Application Ser. No. 06/515,625, abandoned.
Application Ser. No. 06/698,152, abandoned.

DISCUSSION OF PRIOR ART

At the present time the general method of drilling for European concealed hinges and for drilling for holes to insert a ribbed dowel for hinge screws involves the use of large machinery. Either a specially designed boring and insertion machine or the use of a drill press with a specially designed boring head attached. These machines require mounting on a work table provided with some type of stops to correctly position a workpiece to be drilled. The drill press type of machine must be set up each time it is to be used if the drill press is to serve other functions. The depth of the drill bit into the material must be adjusted each time the boring head is employed. The very size of these machines makes it extremely difficult to transport if work of this nature needs to be done at some other location.

The most dramatic disadvantage is the cost involved in order to be able to use an excellent form of cabinet hardware. To overcome the disadvantages of the existing methods, the present invention is developed to produce an effective system to accurately drill material to receive the European concealed hinge hardware that is totally portable and within the financial means of the average individual craftsman.

SUMMARY OF THE INVENTION

The present invention is a hinge installation tool that can be used with a portable electric drill motor.

An object of the invention is a nonskid base with a hole roughly in the center providing clearance for a boring bit, the hinge attachment screw locating pins, and chip ejection during the boring procedure.

Another object of the invention is the provision of movable stops at each side of the base, thereby giving means to accurately position the boring/locating tool at either end of a workpiece.

A further object of the invention is an adjustable fence stop which allows for setting of the distance from the edge of a workpiece to the material removal area of the boring bit and attachment screw locations.

A still further object of the invention is a boring bit holder consisting of a round rod with a linear recessed hole and set screw in one end, constructed to accept the shaft of a standard European hinge boring bit and a reduced shaft diameter on the opposite end to fit into the chuck of a handheld electric drill motor.

Another object of the invention is (2) steel hinge screw locating pins with a head on one end and a point on the opposite end.

A further object of the invention is an arched bridge spanning the clearance hole in the base plate, housing bushings or bearings. The boring bit holder and hinge screw locating pins, passing through the bushings or bearings, are guided into contact with a workpiece.

A still further object of the invention is springs surrounding the boring bit holder and hinge screw locating pins, extending above the bridge assembly, retracting the boring bit and locator pins above the surface of a workpiece.

Another object of the invention is a spring retaining depth adjustment collar surrounding the reduced shaft of the bit holder. By axial movement of the collar, the distance of travel of the boring bit can be adjusted.

A further object of the invention is stabilizing springs surrounding the hinge screw locating pins protruding through the bushings or bearings below the bridge assembly and retained by a collar, thus suspending the hinge screw locating pins. The locating pins can be activated by tapping the pin's head with a mallet or by grasping the pin's head with the fingers, retracting the lower spring and releasing the pin.

A still further object of the invention is the creation of a chip ejection area, formed by the clearance hole in the base and the arched bridge, providing an escape route for debris manufactured by the boring operation.

Another object of the invention is found in the tool's being handheld and portable, allowing for use at a job site, home workshop or professional production use.

A further object of the invention is its efficiency, inasmuch as the device requires only attachment to a standard drill motor.

A still further object of the invention is its economy as the invention does not require attachment to large expensive machinery.

Another object of the invention is its safety by provision of a hood over the chip ejection area in front of the bridge and by a small opening on the opposite side of the bridge, reducing the hazard of injury due to protruding fingers.

A further object of the invention is the distance from center of boring bit to the movable stop, making the tool compatible with the European 32mm construction system.

A still further object of the invention is a centering alignment mark on the top surface of the adjustable fence that can be viewed from the top surface of the base through the clearance hole, allowing the tool to be used without employing the movable stops.

BRIEF DESCRIPTION OF THE DRAWINGS

Other objects and advantages of the invention will become more apparent from the specification taken in conjunction with the accompanying drawings in which:

FIG. 7 illustrates a perspective view of the hinge installation tool.

DETAILED DESCRIPTION OF THE INVENTION

Figure 1:
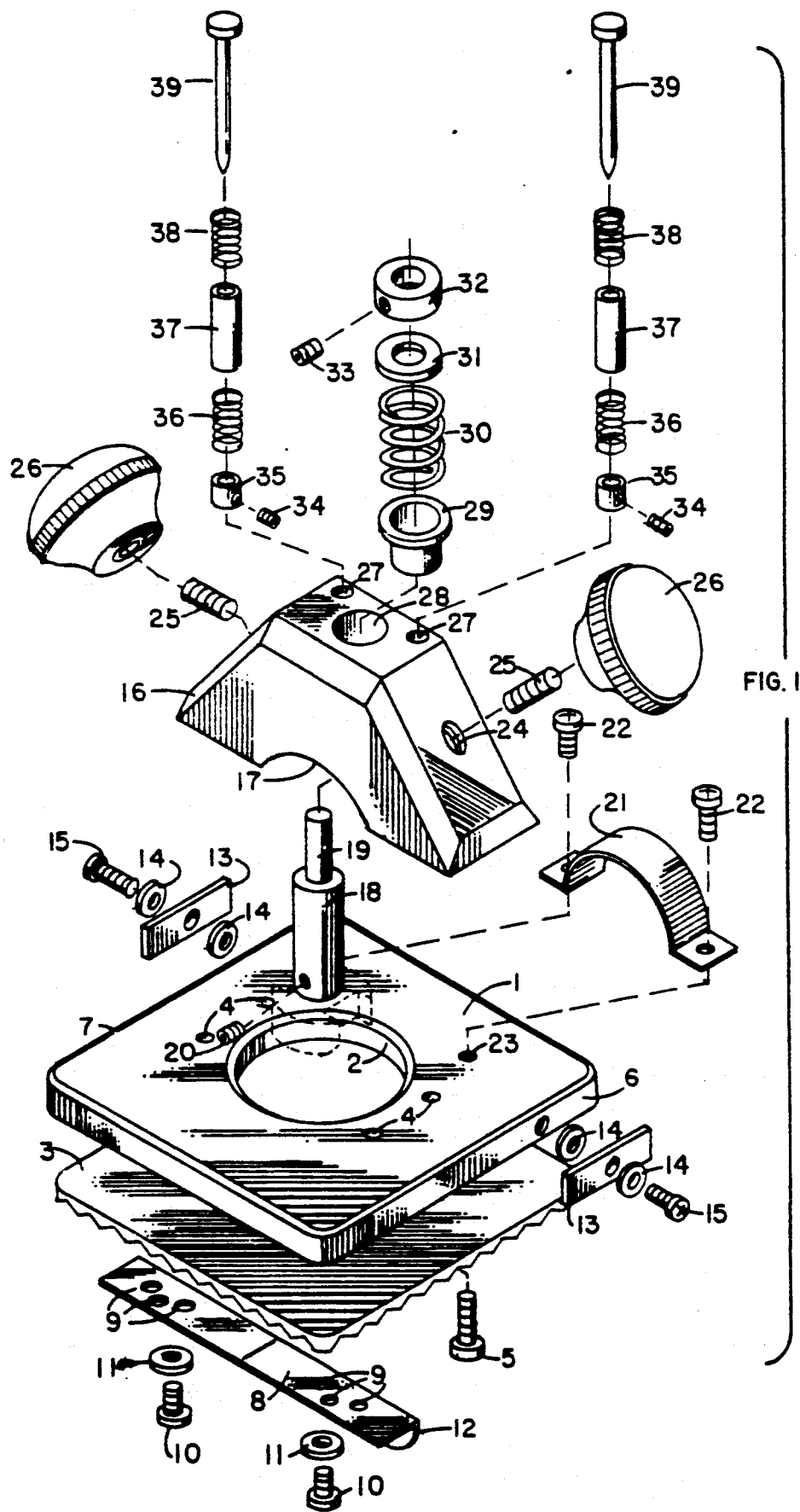
FIG. 1 is an exploded perspective view of the hinge installation tool.

Referring to FIG. 1, numeral 1 designates the hinge installation tool base having a hole center 2, and a bottom nonskid pad 3, bridge assembly mounting holes 4, mounting screws 5, right side 6, left side 7, adjustable guide 8, adjustment holes 9, attachment screw 10, washer 11, guide fence edge 12, intermittent stop 13, washers 14, screw 15, bridge 16, chip removal recess 17, boring bit holder shaft 18, boring bit holder shank 19, bit retaining set screw 20, finger guard 21, attachment screw 22, finger guard mounting holes 23, handle mounting holes 24, handle mounting connector 25, handle 26, hinge screw locating pin bearing mounting hole 27, bit holder bearing mounting hole 28, bit holder bearing 29, retracting spring 30, washer 31, spring retaining and depth adjustment collar 32, set screw 33, set screw 34, retaining collar 35, retracting spring 36, bearing 37, compression spring 38, hinge screw locating pin 39.

Figure 2:
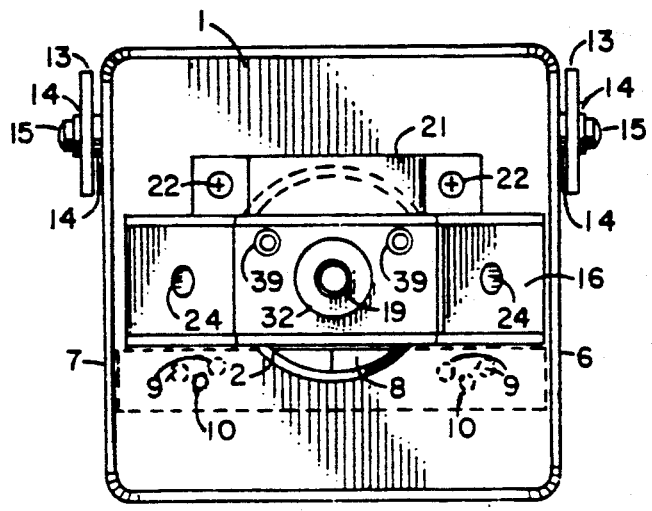
FIG. 2 is a top view of the hinge installation tool.

FIG. 2 illustrates the top view of the hinge installation tool base 1, with hole center 2, guide fence with center line 8, adjustment holes 9, screw 10, intermittent stop 13, washer 14, screw 15, bridge 16, boring bit holder shank 19, finger guard 21, attachment screw 22, handle mounting hole 24, depth adjustment collar 32, hinge screw locating pin 39.

Figures 3, 4:
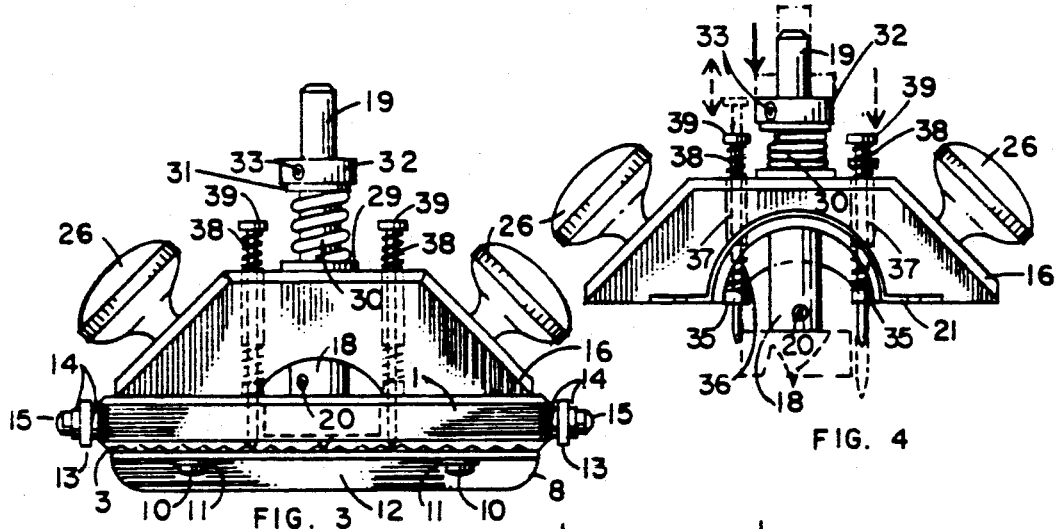
FIG. 3 is a back view of the hinge installation tool.
FIG. 4 is a partial view of bridge assembly showing the boring bit holder fully extended down, one hinge screw locating pin, indicating full downward position, one hinge screw locating pin indicating a retracted up position.

FIG. 3 illustrates the back view of the hinge installation tool base 1, nonskid pad 3, adjustable fence 8, screw 10, washer 11, guide fence edge 12, intermittent stop 13, washer 14, screw 15, bridge 16, boring bit holder shaft 18, boring bit holder shank 19, bit retaining screw 20, handle 26, bit holder bearing 29, retracting spring 30, washer 31, spring retaining and depth adjustment collar 32, set screw 33, compression spring 38, hinge screw locating pin 39.

FIG. 4 illustrates a partial front view of bridge assembly showing a boring bit in the boring bit holder shaft 18, being retained by set screw 20, in a fully depressed position compressing retracting spring 30, set screw 33, left side hinge screw locating pin 39, fully depressed compressing spring 38, guided by bearing 37, retracting spring 36, collar 35, right side hinge screw locating pin 39, fully retracted spring 38, bearing 37, retracting spring 36, collar 35, handles 26, finger guard 21.

Figure 5:
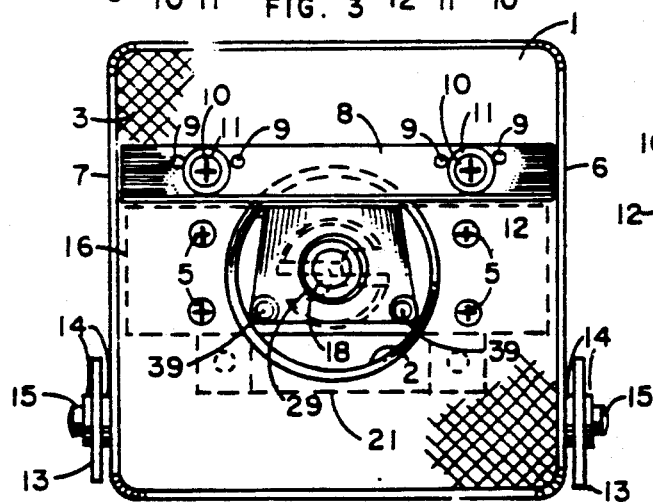
FIG. 5 is a bottom view of the hinge installation tool.

FIG. 5 is a bottom view of the hinge installation tool with base 1, clearance hole 2, nonskid pad 3, bridge attachment screw 5, right side 6, left side 7, adjustable guide fence 8, adjustment holes 9, screw 10, washer 11, guide fence edge 12, intermittent stop 13, washer 14, screw 15, bridge 16, boring bit holder shaft 18, finger guard 21, bearing 29, hinge screw locating pin 39.

Figure 6:
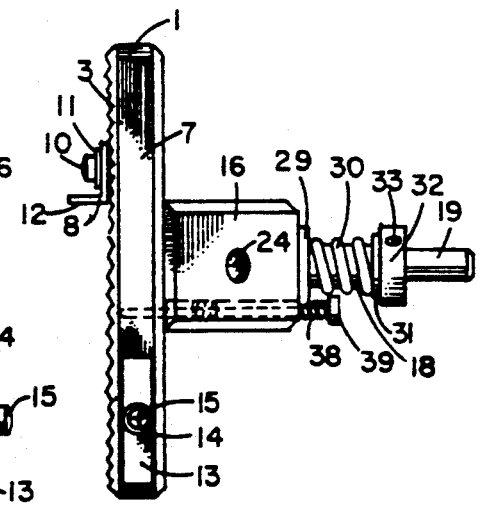
FIG. 6 is a right side view of the hinge installation tool.

FIG. 6 illustrates a right side view of the hinge installation tool with base 1, nonskid pad 3, fence 8, screw 10, washer 11, adjustable guide fence edge 12, intermittent stop 13, washer 14, screw 15, bridge 16, handle mounting hole 24, bit holder shaft 18, bit holder shank 19, bearing 29, retracting spring 30, washer 31, collar 32, set screw 33, hinge screw locating pin 39, spring 38.

I claim:

1. A hardware installation fixture adapted to produce recessed areas at predetermined locations in a workpiece, said tool comprising a base having an upper surface, a substantially flat bottom surface, at least two opposed parallel edges and a generally centrally positioned clearance hole for passage of a boring bit and locating pins, a support member spanning said clearance hole and removably and adjustably attached to the upper surface of said base, said member having bearing means for guiding a boring bit holder for rotative and axial movement, said holder comprising a cylindrical shaft, with attachment means to accept a boring or routing bit, forming an abutment means, for adjustable depth stop means and retraction means provided on said bit, said holder having a shank with a reduced diameter, said member having bearing means for guiding locating pins for axial and rotative movement, said pins comprising a cylindrical shaft with a substantially flat head and a tapered point, said pins provided with means for forming an abutment means for depth stop means and retraction means provided on said pins, a guide having a guide surface, said guide having a center reference line viewable through said clearance hole, said guide being adjustably mounted on the bottom surface of said base so that the distance from said guide surface to the center of said bit may be varied, two intermittent stop members being mounted on opposite parallel edges of said base and positioned to be equidistant from said guiding means in said member, means mounting individual of said stop members for independent positioning of each stop member stop surface in an operative position extending below the bottom surface of said base and an inoperative position wherein the stop member may be fixed above said bottom surface; said bit to be rotatably driven by handheld motive means, said intermittent stop members in combination with said guide establishing said tool for right hand or left hand operating postures, said operating postures being congruent so that said tool may be accurately positioned at either end of a workpiece.

* * * * *